UNITED STATES PATENT OFFICE.

JOHN MURPHY, OF COLUMBUS, OHIO.

HYDRAULIC CEMENT.

SPECIFICATION forming part of Letters Patent No. 270,097, dated January 2, 1883.

Application filed September 20, 1882. (No specimens.)

*To all whom it may concern:*

Be it known that I, JOHN MURPHY, of Columbus, in the county of Franklin and State of Ohio, have invented a new and Improved Hydraulic Cement; and I do hereby declare that the following is a full, clear, and exact description of the same.

The object of my invention is to produce a cheap hydraulic cement or "water-lime," which shall be superior in tenacity and durability. The materials I employ are iron-slag, mica, soapstone, and burnt or roasted clay and lime, which are prepared and mixed in the manner and proportions hereinafter stated. The proportions of the ingredients are as follows: iron-slag, thirty-five parts, by measure; mica, sixteen parts, by measure; soapstone, fourteen parts, by measure; clay, roasted, eighteen parts, by measure; lime, unslaked, seventeen parts, by measure. The clay is the soft blue variety, known as "potter's clay," which is free from sand and unctuous to the touch. The clay and lime are mixed and ground in a pug-mill, a due quantity of water being added to slake the lime and produce a plastic mass having sufficient adhesiveness to enable it to be molded into the form of ordinary bricks. The latter should not be more than two inches thick, in order that they may dry and be quickly burned in a kiln, which operations—to wit, drying and burning—are effected in the same manner as in the case of ordinary building-bricks. The fuel suitable for burning is coke and anthracite coal, and the burning should not be continued to the point of vitrification, since that condition would prevent the combination of the materials which is requisite to make them water-repellent. The clay and lime bricks, having been duly burned, are broken up and ground with the slag, mica, and soapstone, thus reducing all the ingredients to powder, in which form the cement is ready for use in the usual manner.

I am aware that slag, lime, and pulverized brick have been used as elements of cements.

I am aware that lime and burnt clay containing oxide of iron have been used in forming cement, and I disclaim the same except in combination with the other ingredients of my improved compound.

What I claim as new is—

A hydraulic cement composed of iron-slag, soapstone, and clay and lime burned, as described, in the approximate proportions of two parts of the slag to one of each of the other ingredients, as set forth.

The above specification of my invention signed by me in the presence of two subscribing witnesses.

JOHN MURPHY.

Witnesses:
SOLON C. KEMON,
CHAS. A. PETTIT.